United States Patent [19]

Takaoka et al.

[11] Patent Number: 5,751,401
[45] Date of Patent: May 12, 1998

[54] METHOD OF DETERMINING AMOUNT OF EXPOSURE

[75] Inventors: Naoki Takaoka; Atsushi Takagi, both of Kanagawa, Japan

[73] Assignee: Fuji Photo Film Co., Ltd., Kanagawa, Japan

[21] Appl. No.: 552,204

[22] Filed: Nov. 2, 1995

[30] Foreign Application Priority Data

Nov. 4, 1994 [JP] Japan ................................. 6-271393

[51] Int. Cl.⁶ .................... G03B 27/32; G03B 27/52; G03B 27/72; G03B 27/80
[52] U.S. Cl. ........................... 355/32; 355/35; 355/38; 355/40
[58] Field of Search ........................ 355/32, 35, 38, 355/41, 67, 68, 83, 77

[56] References Cited

U.S. PATENT DOCUMENTS

| | | | |
|---|---|---|---|
| 3,677,641 | 7/1972 | King et al. | 355/83 |
| 4,001,594 | 1/1977 | Akimoto et al. | 250/559 |
| 4,531,150 | 7/1985 | Amano | 358/76 |
| 4,745,465 | 5/1988 | Kwon | 358/80 |
| 5,353,095 | 10/1994 | Terashita | 355/38 |
| 5,461,457 | 10/1995 | Nakamura | 355/77 |
| 5,475,493 | 12/1995 | Yamana | 356/404 |
| 5,502,776 | 3/1996 | Manabe | 382/172 |

FOREIGN PATENT DOCUMENTS

| | | | |
|---|---|---|---|
| 57-128330 | 8/1982 | Japan | G03B 27/73 |
| 3230148 | 10/1991 | Japan | G03B 27/73 |

Primary Examiner—R. L. Moses
Assistant Examiner—Shival Virmani
Attorney, Agent, or Firm—Sughrue, Mion, Zinn, Macpeak & Seas, PLLC

[57] ABSTRACT

The improved method of determining the amount of exposure for use with an image forming apparatus reads the red, green and blue densities of an original image on a pixel basis and determines the amount of exposure of a light-sensitive material in accordance with the result of the reading step. In the method, those pixels of the same color which have been found to have red, green and blue densities within respective predetermined ranges as a result of the reading of said original image are added and after at least part of the pixels that represent a color having a greater number of pixels than a specified value are removed, the remaining pixels are used to perform mathematical operations for determining the amount of exposure. When applied to various types of optical image forming apparatus such as copiers, printers and photograph printing devices, the method enables consistent production of good prints having no density or color failure without the need to specify the identity of an image scene of interest even if a large area of the image is occupied by a particular color as in a scene showing a person on the lawn or a scene taken with backlighting.

6 Claims, 5 Drawing Sheets

ND OF THE INVENTION

This invention relates to a method for determining an amount of exposure that is applicable to optical image forming apparatus for use as copiers, printers, etc. and that enables the formation of a high-quality image from originals even if their image does not have good color balance.

Most of the conventional image forming apparatuses such as color copiers and various types of color printers have been adapted for reproducing images from reflection-type originals such as printed matter. However, the technology of recording image information has recently become so versatile that image forming apparatuses have been commercialized that are capable of image recording on light-sensitive materials by reading images not only from reflection-type originals such as printed matter and photographs but also from transmission-type originals such as lantern slides, proofs, microfilms and color negatives and that produce printouts having color images recorded thereon (which are hereunder referred to simply as "prints").

An image forming apparatus that is adapted for the use of both a reflection-type and a transmission-type original is equipped with a light source unit or a scanning unit that comprises the exposure optics for image formation from the transmission-type original, and the user performs imagewise exposure on the light-sensitive material by means of the appropriate exposure optics as selected in accordance with the kind of document to be duplicated and the size of the transmission-type original of interest, with the exposed light-sensitive material being then developed and delivered as a print.

With such an optical image forming apparatus, the original image is read and image characteristic quantities for red (R), green (G), and blue (B) colors are extracted. In accordance with the extracted image characteristic quantities, the amount by which the light-sensitive material is to be exposed is controlled for the respective R, G and B colors so that a desired color image is formed. With a color photographic printer, a technique is widely known that calculates the average R, G and B densities of the image recorded on the original negative and that determines the respective amounts of exposure for R, G and B to be applied to a photographic paper in accordance with the calculated average densities. This technique is commonly known as an LATD-dependent process, LATD being the acronym for large-area transmission density.

A problem with the method of determining the amount of exposure using LATD is that if a large area of the image (on the original to be duplicated) is occupied by a particular color as in a scene showing a human subject sitting on the lawn, so-called "density failure" (i.e., poor density balance) or "color failure" (poor color balance) occurs to make the formation of good prints impossible.

If density failure occurs, the conventional image forming apparatus classifies image scenes into those taken with backlighting, those taken with an electronic flash, snow scenes, etc. and calculates the necessary amount of density correction to determine the proper amount of exposure.

Techniques have also been proposed to deal with the color failure. For example, Unexamined Published Japanese Patent Application (kokai) Sho 57-128330 teaches a method in which the correction level in mathematical operations for calculating the amount of exposure is varied in accordance with the characteristic values determined from the LATD data for the original (color film), and Unexamined Published Japanese Patent Application (kokai) Hei 3-230148 teaches an apparatus that reads the color original on a pixel basis, that removes those pixels having either a large color difference from the reference value or a large color ratio with respect to said reference value, and that thereafter performs mathematical operations to calculate the amount of exposure. These prior art techniques, however, suffer from their own disadvantages. The first proposal involves the need to identify the cause of the color failure and select the proper correction level and, hence, it is essential to classify the image scene on the original. The second proposal also requires classification of the image scene and, hence, prediction of the color of the subject in order to insure that the high-chroma pixels to be removed are correctly identified so that good prints are produced consistently.

Thus, the prior art techniques for determining the amount of exposure have to identify the image scene correctly in order to produce good prints in a consistent manner and if correct identification is not made, good prints cannot be obtained.

SUMMARY OF THE INVENTION

The present invention has been accomplished under these circumstances and has as an object providing a method for determining the amount of exposure that is applicable to an optical image forming apparatus for use as copiers, printers, etc. and that enables consistent production of good prints having no density or color failure without the need to specify the identity of an image scene of interest even if a large area of the image (on the original to be duplicated) is occupied by a particular color as in a scene showing a person on the lawn or a scene taken with backlighting.

This object of the invention can be attained by a method of determining an amount of exposure for use with an image forming apparatus that reads red, green and blue densities of an original image on a pixel basis and that determines the amount of exposure of a light-sensitive material in accordance with a result of the reading step, wherein those pixels of the same color which have been found to have red, green and blue densities within respective predetermined ranges as a result of the reading of said original image are added and wherein, after at least part of the pixels that represent a color having a greater number of pixels than a specified value are removed, the remaining pixels are used to perform mathematical operations for determining the amount of exposure.

In a preferred embodiment, all pixels that represent said color having a greater number of pixels than a specified value are removed or, alternatively, only those pixels which have been found to be superfluous over a given threshold in summation for each color are removed.

In a further preferred embodiment, removing of pixels representing a color having a greater number of pixels than a specified value is not performed in case of the color having the greater number of pixels is either achromatic or near-achromatic.

In a still further preferred embodiment, removing of pixels representing a color having a greater number of pixels than a specified value is not performed in case that mathematical operations for determining the amount of exposure are conducted based on information obtained by designating or detecting principal portions in the original image and further that the color having the greater number of pixels is close to the color of images in the principal portion.

If the originals to be duplicated with optical image forming apparatus are negative films, about 60% of the image scenes can be calculated for the proper amount of exposure on the basis of LATD so as to produce good prints having no density or color failure.

The density or color failure can occur for several reasons such as shooting with inappropriate light sources such as a tungsten lamp and a fluorescent lamp (which are incapable of producing good prints under normal conditions for the exposure of light-sensitive materials), unfavorable characteristics of originals with respect to light-sensitive materials such as the base densities of negative films and their colorant absorption characteristics, and images the larger area of which is occupied by the same or similar colors as exemplified by a human subject sitting on the lawn or a person wearing red clothes from top to bottom (i.e., when image is to be formed from originals having these features).

The invention is primarily intended to prevent the occurrence of density and color failures due to (original) images the larger area of which is occupied by similar colors (such that satisfactory density and color corrections can be effected).

The first step of the method of the invention for determining the amount of exposure is to read the red (R), green (G) and blue (B) densities of an original image on a pixel basis and add those pixels of the same color which have been found to have R, G and B densities within respective predetermined ranges. Stated more specifically, each pixel is allocated on three orthogonal axes representing R, G and B densities in accordance with the specific combination of the R, G and B densities of said pixel, thereby constructing a three-dimensional density histogram of the original image of interest. The histogram is such that pixels falling in the same region represent the same (or similar) color having a similar lightness, chroma and hue. A color having a greater number of pixels occupies the larger area of the image and, hence, can be identified as the cause of density or color failure.

In the present invention, the cause of density or color failure is thus identified and all pixels that represent a color having a greater number of pixels than a specified value are removed or, alternatively, only those pixels which have been found to be superfluous over a given threshold are removed and the remaining pixels (carrying image information) are used to determine image characteristic quantities, on the basis of which mathematical operations are performed to determine the amount of exposure (for density and color corrections).

Thus, according to the present invention, a three-dimensional density histogram is used to remove the cause of density and color failure before the amount of exposure is calculated by mathematical operations and, hence, good prints having neither density nor color failure can be produced consistently without specifying the identity of an image scene of interest.

DETAILED DESCRIPTION OF THE INVENTION

The method of the invention for determining the amount of exposure will now be described in detail with reference to the accompanying drawings.

Figure 1:
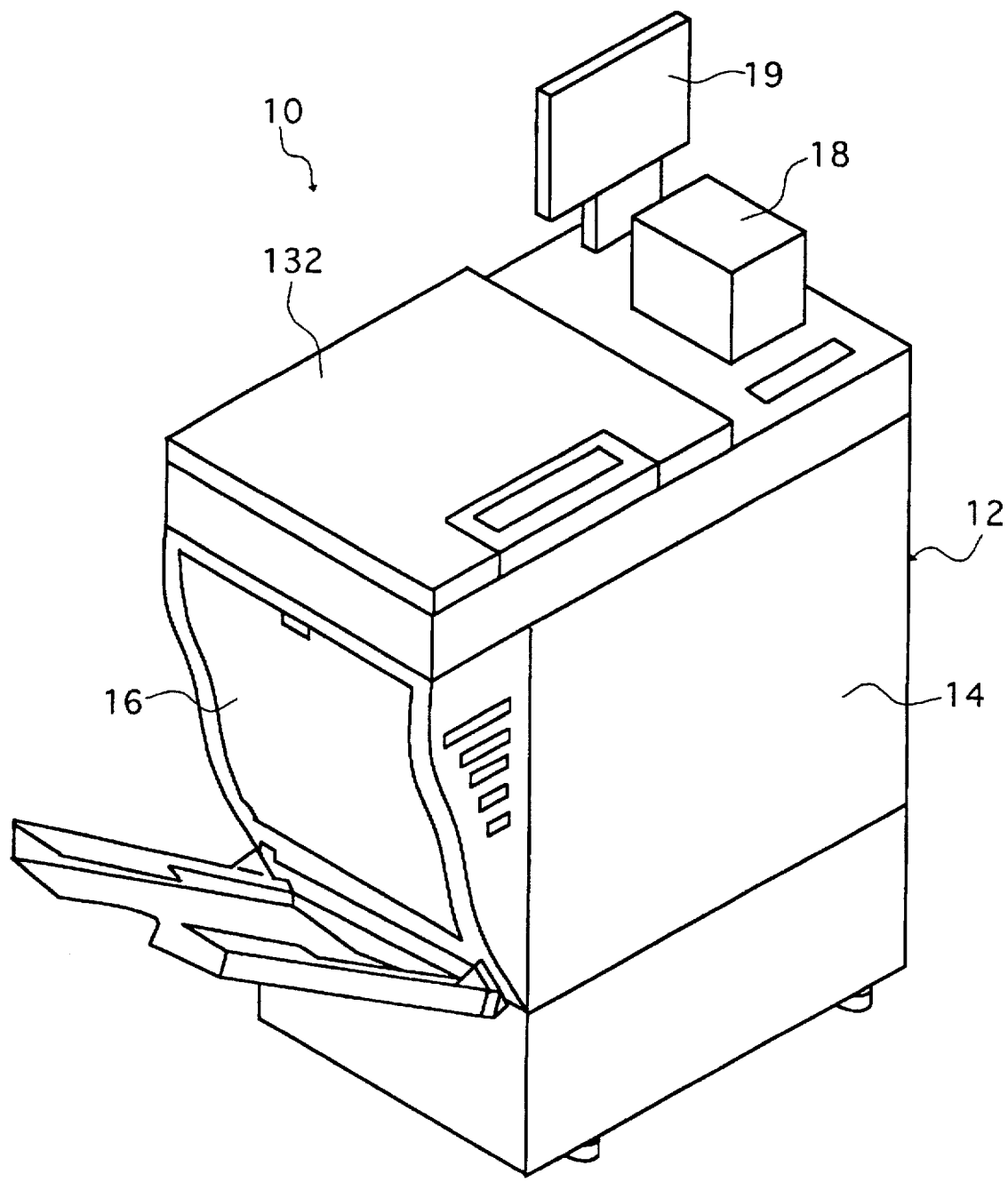
FIG. 1 is a simplified perspective view of a copier that uses the method of the invention for determining the amount of exposure.
Figure 2:
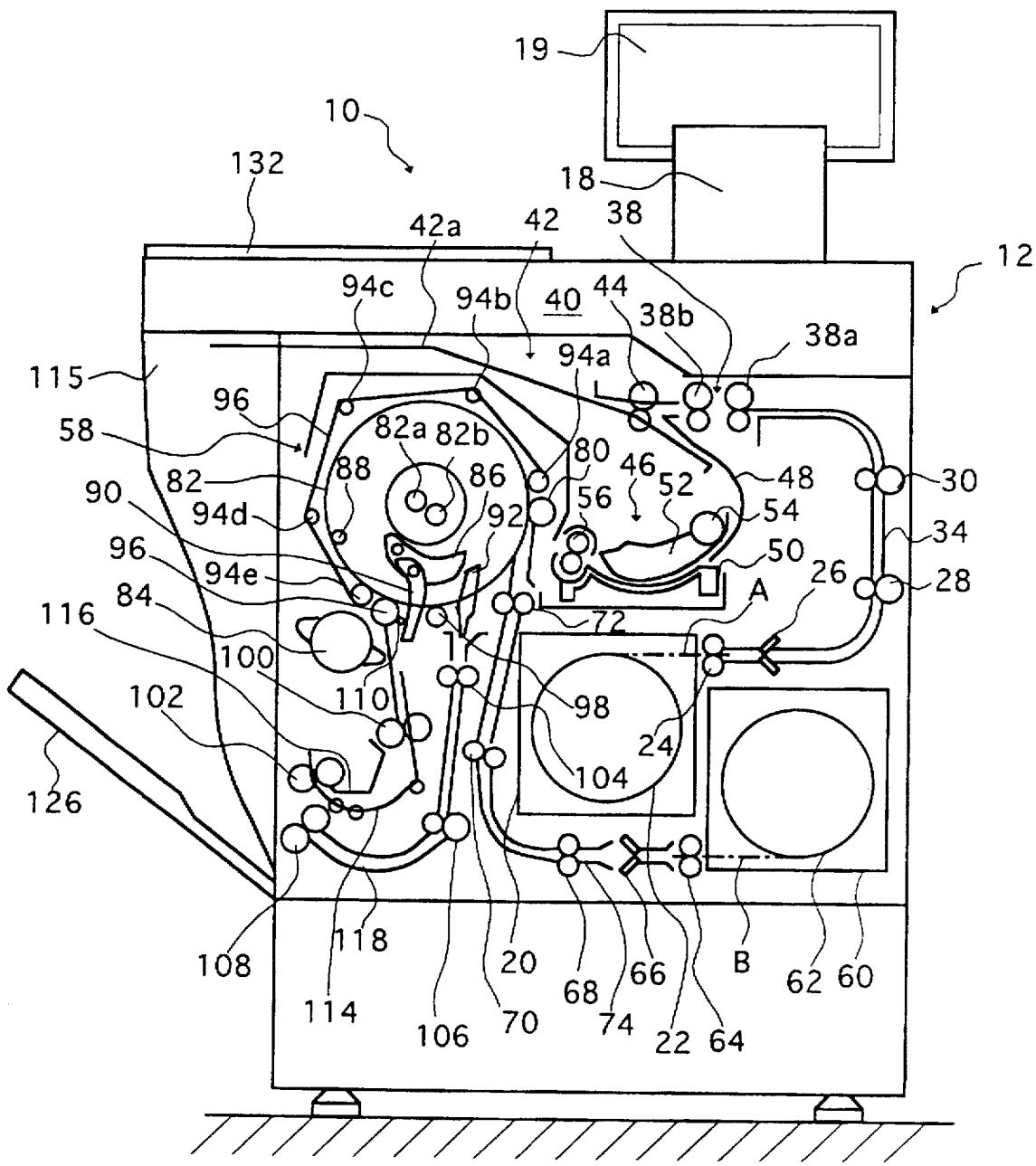
FIG. 2 is a simplified view showing the interior of the copier shown in FIG. 1.

FIG. 1 is a perspective exterior view of a copier that uses the method of the invention for determining the amount of exposure, and FIG. 2 is a simplified view of the interior of the copier.

The copier shown in FIG. 1 is an apparatus that uses as a recording medium a light-sensitive material that requires thermal development and which transfers and forms an image onto an image-receiving layer in an image-receiving material in the presence of an image-forming solvent such as water. This apparatus is capable of duplicating not only the image on reflection-type originals such as printed matter and photographs but also the image on transmission-type originals such as 135 size lantern slides, proofs and color negatives.

It should be noted that the method of the invention for determining the proper amount of exposure is in no way limited to the particular light-sensitive material and image forming method that are mentioned above and that it is applicable to various other types of light-sensitive material and image-forming methods that are capable of forming a latent image by imagewise exposure and processing it by a predetermined procedure to produce a visible image.

Hence, light-sensitive materials that may be used are exemplified by conventional types of color photographic materials (e.g. negative films, reversal films and color photographic papers), color diffusion transfer light-sensitive materials, thermally processable color photographic materials and light- and pressure-sensitive color photographic materials. The amount of exposure to be given to these materials may be determined by the method of the invention and, after exposure suitable for a particular light-sensitive material, the latent image may be processed to become visible.

If a positive image is to be formed from a positive original, so-called "positive-positive" light-sensitive materials may specifically be used; if a positive image is to be formed from a negative original, so-called "negative-positive" light-sensitive materials should be used.

The copier generally shown by 10 in FIG. 1 is box-shaped and comprises a housing 12 that has a front door 14 and a side door 16. To have the interior of the apparatus exposed, these doors may be opened.

The copier 10 is fitted on the top of the housing with a detachable film scanning unit 18 for copying small-size transmission-type originals such as 135 size color negatives and lantern slides. For copying comparatively large transmission-type originals such as 4×5 size lantern slides, proofs and sleeves, a dedicated light source unit is placed on top of the copier in a predetermined position.

Positioned on top of the copier 10 and behind the film scanning unit 18 is a monitor 19 that displays an original image as read by a line sensor 160 (to be described later) and which performs various manipulations.

The copier 10 has a light-sensitive material magazine 20 positioned in the lower part of the center of the housing 12. The magazine 20 contains a roll 22 of a thermally processable light-sensitive material A.

A roller pair 24 for withdrawing and transporting the thermally processable light-sensitive material A from the magazine 20 is positioned near its exit. A cutter 26 is positioned downstream of the roller pair 24 in the direction of the transport of the thermally processable light-sensitive material A (the term "downstream" as used hereinafter shall always be referenced to the transport of the light-sensitive material). The cutter 26 will cut the thermally processable light-sensitive material A to a predetermined length after it has been withdrawn out of the magazine 20.

Transport rollers 28 and 30 and transport guide plates 34 are positioned downstream of the cutter 26 so as to transport the thermally processable light-sensitive material A upward to an exposing section 38. The exposing section 38 is provided between transport roller pairs 38a and 38b and equipped with an exposure unit 40 on its top. In the illustrated copier 10, the thermally processable light-sensitive material A is transported through the exposing section 38 as it is held in a predetermined position by means of transport roller pairs 38a and 38b and the transported light-sensitive material A is subjected to slit scan exposure by means of slit light that carries image information from the exposure unit 40 (or film scanning unit 18).

Details of the exposure unit 40 and the film scanning unit 18 will be given later with reference to FIG. 3.

A switchback section having a transport guide plate 42a and a transport roller pair 44 is provided alongside the exposing section 38. A water applicator section 46 is provided below the exposing section 38.

The thermally processable light-sensitive material A that has been withdrawn out of the magazine 20 to be cut to a predetermined length and that has been transported to the exposing section 38 where it is imagewise exposed is brought into the switchback section 42 by means of the roller pair 44 and the guide plate 42a. Then, the roller pair 44 rotates in reverse direction so that the light-sensitive material A is ejected from the switchback section 42 and guided by a transport guide plate 48 to be transported to the water applicator section 46.

The water applicator section 46 has an application tank 50 filled with an image forming solvent and a guide member 52 that is positioned in a face-to-face relationship with the tank 50. A supply roller 54 for bringing the thermally processable light-sensitive material A into the tank 50 is positioned at an end of the water applicator section 46 which is upstream of the tank 50, and a squeeze roller pair 56 for removing excess water from the light-sensitive material A is positioned at the other end of the water applicator section 46 which is downstream of the tank 50.

The thermally processable light-sensitive material A that has been exposed in the exposing section 38 is driven by the supply roller 54 to pass between the application tank 50 and the guide member 52 as it is coated with water which is an image forming solvent. Thereafter, the light-sensitive material A is passed through the squeeze roller pair 56 so that it is freed of excess water before it is sent to a thermal development and transfer section 58 which is positioned downstream of the water applicator section 46.

An image-receiving material magazine 60 is positioned to the right of the magazine 20 as seen in FIG. 2. The magazine 60 contains a roll 62 of an image-receiving material B. The image-receiving material B is formed in a smaller width than the thermally processable light-sensitive material A in order to insure that the two members can be easily separated after the thermal development which will be described hereinafter.

A withdrawing roller pair 64 for withdrawing and transporting the image-receiving material B is positioned near the exit of the magazine 60. A cutter 66 is positioned downstream of the roller pair 64 so that it cuts the image-receiving material B to a predetermined length after it has been withdrawn out of the magazine 60. It should be mentioned here that the image-receiving material B is cut to a shorter length than the light-sensitive material A in order to insure that the two members can be easily separated after the thermal development which will be described hereinafter.

Positioned downstream of the cutter 66 are transport roller pairs 68, 70 and 72, and transport guide plates 74; the image-receiving material B that has been cut to a predetermined length is transported from below the magazine 20 to go upward so that it is brought into the thermal development and transfer section 58. The transport roller 72 also serves as a registration roller for correcting any "skew" of the image-receiving material B that may have occurred as a result of transport. The "skew" corrected image-receiving material B is thus brought into the thermal development and transfer section 58.

A laminating roller 80 for bringing the thermally processable light-sensitive material A and image-receiving material B into a unitary assembly is positioned downstream of the squeeze roller pair 56 and the transport roller pair 72. The laminating roller 80 is in pressure-contact with a heating drum 82 in the thermal development and transfer section 58. It is coupled to a drum motor 84 by a known driving force transmission system (not shown) so that the driving force of the motor 84 is transmitted to the roller 80 for rotating it.

The thermally processable light-sensitive material A is brought into the gap between the laminating roller 80 and the heating drum 82 by means of the squeeze roller pair 56. Except that the light-sensitive material A precedes the image-receiving material B by a predetermined length, the transport of the two members is synchronous and the image-receiving material B is likewise brought into the gap between the laminating roller 80 and the heating drum 82 so that it is placed in a superposed relationship with the light-sensitive material A.

As already mentioned, the four sides of the light-sensitive material A are slightly longer than those of the image-receiving material B and, hence, when superposed, the four sides of the former will project beyond the latter.

A cam 86 and a feeler 88 are fixed to a lateral side of the heating drum 82 in the thermal development and transfer section 58. Cam 86 is adapted to be engagable with stripping fingers 90 and 92 (to be described later) on the heating drum 82 and as it rotates, the cam 86 engages the fingers 90 and 92 successively to pivot them. Feeler 88 is used to check whether the heating drum 82 is in registry with each of the light-sensitive material A and the image-receiving material B.

A pair of halogen lamps 82a and 82b are contained in the heating drum 82. The two halogen lamps 82a and 82b produce different powers, say, 400 W and 450 W, for heating the surface of the drum 82 to a predetermined temperature. In the illustrated copier 10, both lamps are used to heat the drum 82 to the predetermined temperature but lamp 82a alone is used during steady-state operation after the predetermined temperature has been reached.

An endless belt 96 is wound around the heating drum 82 as it is stretched on five rollers 94a, 94b, 94c, 94d and 94e. The four rollers 94a–94d are made of stainless steel whereas the roller 94e is made of rubber. The outside surface of the endless belt 96 between the rollers 94a and 94e is in pressure-contact with the circumference of the heating drum 82.

The rubber roller 94e is coupled to the drum motor 84 by means of a known driving force transmission system (not shown); as the roller 94e rotates, the endless belt 96 is rotated and the rotational force is transmitted to the heating drum 82 by the force of friction between the endless belt 96 and the heating drum 82, which in turn rotates.

The known driving force transmission system (not shown) allows the drum motor 84 to drive a plurality of driven parts in unison, including roller 94e, laminating roller 80, squeeze roller pair 56, as well as the following components to be described later: a bending guide roller 97, a stripping roller 98, light-sensitive material ejecting roller pairs 100 and 102, and image-receiving material ejecting roller pair 104, 106, and 108.

The thermally processable light-sensitive material A and the image-receiving material B that have been combined by the laminating roller 80 are transported as they are held in the superposed relationship between the heating drum 82 and the endless belt 96 so that they travel over a distance equal to about two-thirds of the circumference of the heating drum 82 (between rollers 94a and 94e). If necessary, the transport of the two members A and B may be ceased as they are completely confined between the heating drum 82 and the endless belt 96 so that they are heated for a predetermined time. In the illustrated case of image formation, the thermally processable light-sensitive material A is heated to release mobile dyes while, at the same time, the released dyes are transferred onto the dye-fixing layer in the image-receiving material B so that a visible image is formed on the image-receiving layer in the image-receiving material B.

Bending guide roller 97 which is pressed against the circumference of the heating drum 82 under a predetermined force is positioned downstream of the roller 94e in the direction of the rotation of the drum 82. Stripping finger 90 and a pinch roller 110 are positioned downstream of the guide roller 97. Stripping finger 90 is pivotally supported on a shaft and it is allowed to pivot under the action of the cam 86 so that it can contact or depart from the surface of the heating drum 82. The pinch roller 110 is normally held against the bending guide roller 97 at a predetermined pressure and adapted in operative association with the pivoting of the stripping finger 90 in such a way that when the latter contacts the heating drum 82, the roller 110 will get clear of the guide roller 97.

When both the light-sensitive material A and the image-receiving material B have been transported to the position of stripping finger 90, the cam 86 works to have the finger contact the heating drum 82 and the front end of the light-sensitive material A which has been superposed on the image-receiving material B after a predetermined length of lead engages the finger 90, which then strips the light-sensitive material A from the surface of the heating drum 82.

When the front end of the light-sensitive material A is stripped from the heating drum 82 by the predetermined length, the cam 86 works to get the finger 90 clear of the heating drum 82 while, at the same time, the pinch roller 110 contacts the guide roller 97 so that the stripped front end of the light-sensitive material A is held between the two rollers 110 and 97. Hence, the light-sensitive material A which has been stripped from the heating drum 82 is transported downward as it is held between the pinch roller 110 and the bending guide roller 97.

Light-sensitive material ejecting roller pairs 100 and 102 and two transport guide plates 114 and 116 are positioned downstream of the pinch roller 110 and guide roller 97; these roller pairs and guide plates are so adapted that the light-sensitive material A which has been stripped from the heating drum 82 is transported first downward, then to the left as seen in FIG. 2 so that it is ejected into a scrap light-sensitive material stack box 115.

Stripping roller 98 and stripping finger 92 are positioned downstream of the guide roller 97 and stripping finger 90 in the direction of the rotation of the heating drum 82. Stripping roller 98 is made of silicone rubber and urged against the circumference of the heating drum 82 at a predetermined pressure so that it will rotate under the action of the drum motor 84 (see supra). On the other hand, the stripping finger 92 is so adapted that it will pivot under the action of the cam 86 (also see supra) to either contact or depart from the circumference of the heating drum 82.

If the light-sensitive material A is stripped from the heating drum 82 in the manner described above and when only the image-receiving material B is transported around the drum 82, the cam 86 works to have the stripping finger 92 contact the drum 82, thereby stripping the front end of the image-receiving material B. At the same time, the stripping roller 98 and the stripping finger 92 contact the heating drum 82 and guide the image-receiving material B to bend downward for further transport.

Image-receiving material ejecting roller pairs 104, 106 and 108, as well as transport guide plates 118 are positioned downstream of the stripping roller 98 and the image-receiving material B which has been stripped from the heating drum 82 is transported first downward, then to the left as seen in FIG. 2 so that it is ejected onto a tray 126 fixed on the left side of the housing 12.

If necessary, a drum fan, a ceramic heater or any other suitable means may be positioned along the transport paths of the light-sensitive material A and the image-receiving material B which have been stripped from the heating drum 82 or in the neighborhood of the heating drum 82 for the purpose of accelerating the drying of the two members A and B.

As already mentioned, the exposure unit 40 is positioned above the exposing section 38, and the copier 10 is fitted in the upper right portion of the housing 12 (as seen in FIG. 2) with the detachable film scanning unit 18 which is specifically used to copy small-size transmission-type originals T such as 135 side color negatives and lantern slides.

Figure 3:
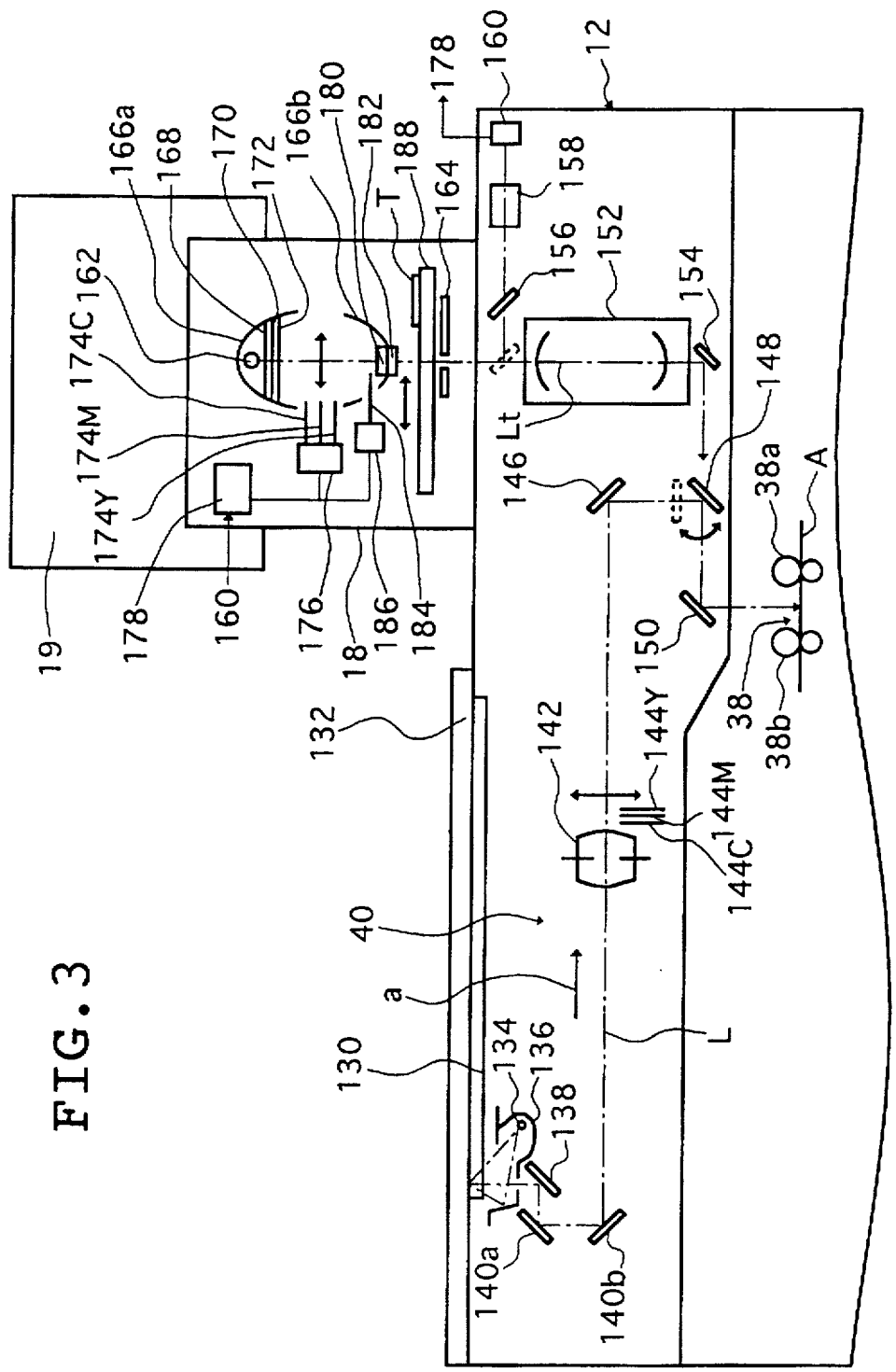
FIG. 3 is a simplified view showing the interior of the exposure unit in the copier of FIG. 1, as well as the interior of a film scanning unit that may optionally be loaded in the copier.

FIG. 3 is a diagram showing the concept of the exposure unit 40 and the film scanning unit 18. The exposure unit 40 provides exposure optics that is used primarily for copying the images of reflection-type originals such as printed matter and photographs, and those of comparatively large-size transmission-type originals such as proofs and lantern slides.

As FIG. 3 shows, a document platen 130 and a document pressing plate 132 are positioned on top of the housing 12 of the copier 10; the document platen 130 is used to carry a reflection-type original and typically made of transparent glass, and the document pressing plate 132 is fitted as required to fix the reflection-type original on the platen 130 and may be removed if there is no need to use it.

When copying the image of a comparatively large-size transmission-type original such as a proof or a sleeve, the plate 132 is removed and a dedicated light source unit for illuminating the document on the platen 130 from above is mounted in a predetermined position.

Located below the document platen 130 is a light source unit which is an integral assembly of an exposing light source 134 to be used for copying the image of the reflection-type original, a reflector 136 and a mirror 138. In the illustrated apparatus, the reflector 136 also serves as a slit defining member that restricts the width, taken in the scanning direction, of reflected light from the reflection-type original (or transmitted light through a transmission-type original).

The light source unit under consideration moves beneath the platen 130 in the scanning direction indicated by arrow a so that the reflection-type original is illuminated with light from the light source 134. It should be mentioned here that when copying a comparatively large-size transmission-type original using a dedicated light source unit, the light source 134 is not lit but the light source unit is simply moved to scan the underside of the platen 130, whereupon the transmitted light from the transmission-type original passes through the slit.

The light issuing from the light source 134 is reflected by the reflection-type original, passes through the slit and is reflected by the mirror 138 to travel in a predetermined direction. The reflected light is then admitted into a mirror unit which is an integral assembly of two mirrors 140a and 140b and by which the light travelling in the optical path L is reflected in predetermined directions. The mirror unit is adapted to move in the same direction as the above-mentioned light source unit but at one half its speed.

Located downstream of the mirror unit in the optical path L is a lens unit 142 which is an integral assembly of an imaging lens and a variable diaphragm for adjusting the quantity of light (i.e., density). The variable diaphragm consists typically of two light-shielding plates that are opposed to each other in a direction perpendicular to the optical path L and which can be inserted into or removed from the optical path as required. The quantity of reflected light is controlled by adjusting the gap between the two light-shielding plates.

A color filter unit for adjusting color balance is positioned downstream of the lens unit 142. The color filter unit is composed of three color filter plates, namely, Y (yellow) filter 144Y, M (Magenta) filter 144M and C (cyan) filter 144C. The color balance of reflected light is controlled by adjusting the amount in which each of the three color filter plates is inserted into the optical path L.

Located downstream of the color filter unit in the optical path L are three mirrors 146, 148 and 150 for causing the reflected light to be reflected in predetermined directions. The oncoming reflected light in the optical path L is further reflected in predetermined directions by those mirrors and keeps travelling in the optical path L until it reaches the exposing unit 38, where it is focused for exposure of the thermally processable light-sensitive material A in the process of scanning transport.

The mirror 148 is adapted to be pivotal; for copying reflection-type originals and comparatively large-size transmission-type originals using the exposure unit 40, the mirror 148 takes the position indicated by a solid line in FIG. 3 and for copying a small-size transmission-type T such as a color negative using film scanning unit 18, the mirror 148 moves to the position indicated by a dashed line in FIG. 3.

The exposure unit 40 is also fitted with an image sensor (not shown) that measures the quantity of reflected light for the respective colors, red (R), green (G) and blue (B). The image sensor reads the original image in a prescanning step and determines the amount by which the quantity of light is to be adjusted through the variable diaphragm in the lens unit 142, as well as the amounts by which the respective color filter plates in the color filter unit are to be inserted into the optical path L.

As already mentioned, the illustrated copier 10 is an apparatus that is also capable of copying small-size transmission-type originals T such as a color negative and a lantern slide; it has the film scanning unit 18 mounted detachably on top of the right portion of the housing 12 to provide exposure optics for copying the image of transmission-type original T. The exposure unit 40 lying below the film scanning unit 18 has the following components positioned to the right of mirrors 146 and 148 as seen in FIG. 3: a zoom lens 152 and a mirror 154 that compose exposure optics for copying transmission-type original T, as well as a moving mirror 156, imaging lens 158 and a line sensor 160 for measuring on a pixed basis the quantity, color, etc. of transmitted light through the transmission-type original T in the prescan step.

The film scanning unit 18 illuminates the transmission-type original T with light from the light source 162 as it moves in synchronism with the transport of the thermally processable light-sensitive material A. The light transmitted through the original T and the slit 164 in that order is projected onto the light-sensitive material A as enlarged with zoom lens 152 at a magnification of 200–850%, whereby the light-sensitive material A is exposed to the transmitted light from the original T for copying the image of that original.

The light source 162 may be of any type that is suitable for color reprography, as exemplified by a halogen lamp and a flash lamp. Located above the light source 162 is a reflector 166a by which the light from the light source 162 is reflected toward the original T, and located below the light source 162 is a reflector 166b that is opposed to the reflector 166a so an even higher optical efficiency is achieved.

Located downstream of the light source 162 along the optical path Lt are an IR cut filter 168, a UV cut filter 170 and a B-G notch filter 172 for cutting off a mixture of blue and green lights.

Located downstream of the B-G notch filter 172 is a filter section that adjusts the color balance of the light illuminating the transmission-type original T and, hence, the color balance of the image to be formed. The filter section is composed of three color filter plates, Y filter 174Y, M filter 174M and C filter 174C, and an adjusting unit 176 which allows the respective filters to be inserted into the optical path Lt.

The illustrated adjusting unit adjusts the amounts of insertion of the respective filters into the optical path Lt, thereby adjusting the color balance of the light illuminating the transmission-type original T. In order to set the conditions for image formation or in order for the user to perform color adjustments and in accordance with such information as the exposure correcting conditions that depend on the quality of the image on the original T, the adjustment unit 176 moves the respective filters by a known moving means such as a rack and pinion using associated pulse motors as drive sources, whereby the respective filters are inserted into the optical path Lt.

The amounts in which the respective filters are inserted into the optical path by means of the adjustment unit 176 are determined by a control unit 178. In the illustrated copier 10, the amounts in which the respective color filter plates are to be inserted by the adjusting unit 176 are determined in accordance with the method of the invention for determining the amount of exposure.

A variable diaphragm 184 for adjusting the quantity of light that illuminates the transmission-type original T is located downstream of the filter section. The variable diaphragm 184 is composed of light-shielding plates, a ND filter having a density gradient or the like. In the illustrated apparatus, an adjusting unit 186 controls the quantity of light by adjusting the amount in which the variable diaphragm 184 is to be inserted into the optical path Lt.

In order to set the conditions for image formation or in order for the user to perform color adjustments and in accordance with such information as the exposure correcting conditions that depend on the quality of the image on the original T, the adjustment unit 186 moves the diaphragm 184 by a known moving means such as a rack and pinion using an associated pulse motor as a drive source, whereby the variable diaphragm 184 is inserted into the optical path Lt.

The amount in which the variable diaphragm 184 is inserted into the optical path by means of the adjustment unit 186 is also determined by the control unit 178. In the illustrated copier 10, the amount in which the variable diaphragm 184 is to be inserted by the adjusting unit 186 is determined in accordance with the method of the invention for determining the amount of exposure.

A diffusion glass 180 and a Fresnel lens 182 are positioned at the opening in the reflector 166b located downstream of the variable diaphragm 184. The diffusion glass 180 diffuses and mixes the rays of light that has been color adjusted in the filter section so as to create uniform light that is free from the problem of unevenness in colors and illumination. The Fresnel lens 182 has such a function that the light diffused by the diffusion glass 180 is allowed to travel along the optical path Lt so it becomes convergent.

The transmission-type original T is placed on a scan table 188 located downstream of the Fresnel lens 182. The scan table 188 holds the transmission-type original T in a predetermined position and the original T is scanned by transversely moving it (as seen in FIG. 3) in synchronism with the transport of the thermally processable light-sensitive material A in the exposing section 38. Located beneath the scan table 188 is a slit defining member 164 that extends longitudinally in a direction perpendicular to the direction of movement (scanning) of the original T and which has the center of width in alignment with the optical axis Lt.

Thus, the transmission-type original T moving above the slit 164 in a direction perpendicular to it will be slit scanned by the light from the light source 162.

The method of moving the transmission-type original T over the scan table 188 is in no way limited and any known transport means such as thread transmission, wrapping transmission or a rack and pinion adjustment may be effectively used. The moving speed of the original T is one nth of the transport speed of the thermally processable light-sensitive material A, with n being the copy ratio that is achievable by the film scanning unit 18.

In the illustrated apparatus, the transmission-type original T may be scanned either by moving it on the scan table 188 or by moving the scan table 188 per se.

The transmitted light that has passed through the slit 164 travels in the optical path Lt to be admitted into the zoom lens 152 located within the exposure unit 40. The transmitted light from the original T which has passed through the slit 164 undergoes magnification to 200%–850% by means of the zoom lens 152 to form an image at the exposing position in the exposing section 38.

The transmitted light from the original T which has passed through the zoom lens 152 has its optical path deflected by the mirror 154 through an angle of about 90° so that it is brought into agreement with the optical path L of the reflected light from the reflection-type original before it falls on the mirror 150. As already mentioned, the mirror 148 pivots to the position indicated by a dashed line in FIG. 3 when the image of the transmission-type original T is to be copied using the film scanning unit 18.

As in the case of the reflected light from the reflection-type original, the transmitted light from the original T that has been reflected downward by the mirror 150 is focused at a predetermined exposing position on the thermally processably light-sensitive material A in the process of transport by the roller pairs 38a and 38b, so as to perform slit scan exposure on the material A.

It should be noted that the transmission-type original T is moved by the scan table 188 in synchronism with the scan transport speed of the light-sensitive material A, namely, at a speed which is one nth of the transport speed of the material A, with n being the factor of magnification by the projection optics. Hence, the whole image of the original T is scanned for exposure on the light-sensitive material A as it is moved over the entire image region.

As already mentioned, the illustrated apparatus has the moving mirror 156, imaging lens 158, line sensor 160 and other devices for measuring the quantity, color, etc. of the transmitted light from the original T in the prescan step; using these devices, the apparatus performs prescanning prior to the copying of the original T so that its image is read for determining the amount by which the image to be copied should be exposed, namely, the amounts by which the three color filter plates (Y filter 174Y, M filter 174M, and C filter 174C) in the filter section should be inserted into the optical path Lt, and the amount by which the variable diaphragm 184 should be inserted into the optical path Lt.

As FIG. 3 shows, moving mirror 156 is positioned upstream of the zoom lens 152 in such a way it can be inserted into or removed from the optical path Lt as required. During prescan, the moving mirror 156 is inserted into the optical path Lt as indicated by a dashed line in FIG. 3, whereby the transmitted light from the original T is deflected through an angle of 90°.

The transmitted light thus deflected in the optical path by the mirror 156 is adjusted for focus by means of the imaging lens 158 before it is admitted for imaging in the line sensor 160.

The line sensor 160 consists of three rows of line sensors, one having a R filter, the second having a G filter, and the third having a B filter. Each line sensor is typically a 256-pixel MOS line sensor which is capable of reading the image of transmission-type original T at a resolution of 256 pixels per line for each of the three primary colors R, G and B. If the transmission-type original T is a 35-mm negative film, the image is read at a resolution of about 6000 pixels consisting of 100 divisions along the longer side and 60 divisions along the shorter side.

The output from the line sensor 160 is forwarded to the control unit 178, which determines the amount by which the thermally processable light-sensitive material A should be exposed during copying of the image of the original T, namely, the amount of color correction such as the amounts by which the respective color filter plates in the filter section should be inserted into the optical path Lt, and the amount by which the variable diaphragm 184 should be inserted into the optical path Lt.

Figure 5:
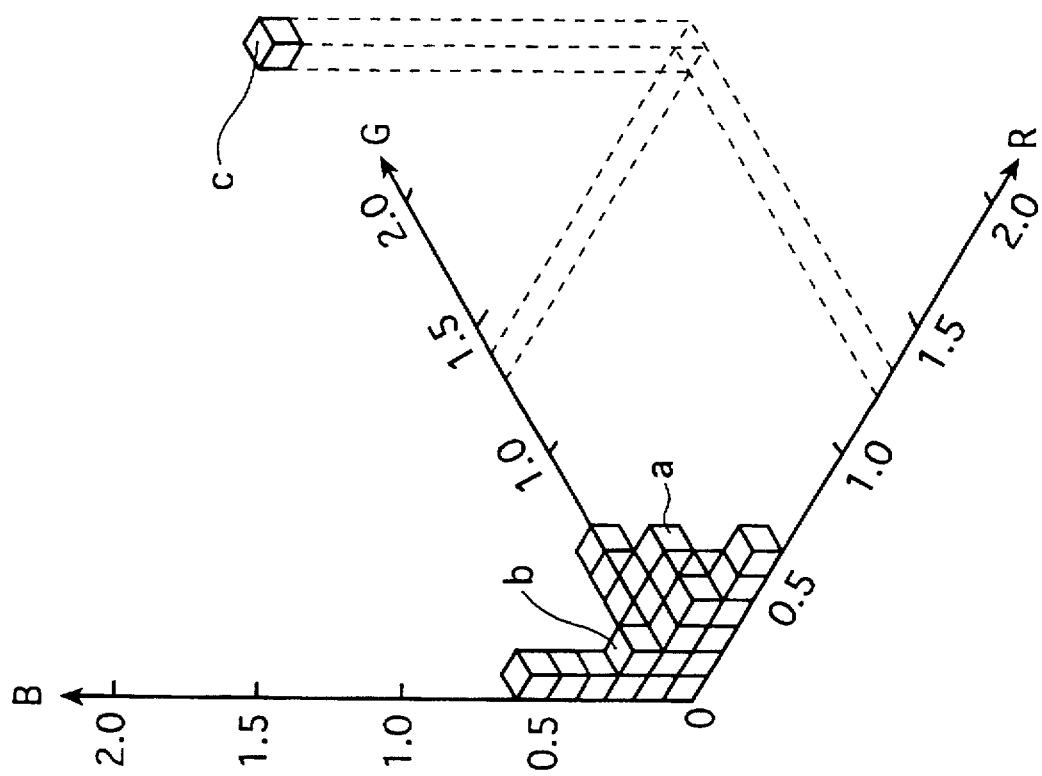
FIG. 5 shows the concept of constructing a three-dimensional histogram in implementing the method of the invention for determining the amount of exposure.

The illustrated copier 10 is adapted to determine the amount of exposure in accordance with the present invention by the following procedure: the image of the transmission-type original T is read on a pixel basis for the three colors R, G and B; those pixels of the same color which have R, G and B densities within respective predetermined ranges are added (stated more specifically, a three-dimensional histogram having pixels allocated on the respective axes of R, G and B densities is constructed as shown in FIG. 5 and the pixels within the same region (block) on the histogram are added); at least part of the pixels that represent a color having a greater number of pixels than a specified value are removed; and the remaining pixels are used to perform mathematical operations to determine the amount by which the thermally processable light-sensitive material A should be exposed (this amount of exposure of the light-sensitive material is hereunder referred to as the "amount of exposure for copying").

The procedure will now be described in greater detail with reference to the flowchart in FIG. 4 which depicts an exemplary method of determining the amount of exposure according to the invention.

First, the line sensor delivers output (color) signals to the control unit 178, which performs A/D conversion and logarithmic transformation on said output signals to produce image density signals for respective colors, which are then stored separately in a memory (RAM) on a pixel basis.

The control unit 178 then constructs a three-dimensional density histogram on the basis of the combinations of R, G and B densities of the respective pixels. The construction of such a density histogram is shown conceptually in FIG. 5. Each of the R, G and B densities is plotted on the associated axis at intervals of a fixed value, say, 0.1. As shown in FIG. 5, the histogram space is divided into a number of regions (blocks) representing density ranges each defined by a cube having a dimension of 0.1 on each side.

Each pixel is allocated to one of these blocks depending on the combination of R, G and B densities, for example, to block a if the pixel has a R density of 0.2–0.3, a G density of 0.3–0.4 and a B density of 0–0.1, or block b if the pixel has a R density of 0.1–0.2, a G density of 0–0.1 and a B density of 0.2–0.3 and the thus allocated pixels are counted as a three-dimensional density histogram is constructed.

With the three-dimensional histogram being thusly constructed, the operator notes the block for which a great number of pixels are counted. The histogram is such that the pixels counted for the same block have the same density for R, G and B and, hence, may well be regarded as pixels of the same (or similar) color being similar in lightness, chroma and hue. For example, in the illustrated case, a pixel having R, G and B densities of 1.22, 1.34 and 1.45, respectively, a pixel having R, G and B densities of 1.26, 1.32 and 1.44, and a pixel having R, G and B densities of 1.29, 1.31 and 1.45 may well be regarded as being of the same color which should be counted for block c.

Thus, the number of counts (pixels) allocated to each block can be used as the basis for detecting the proportion of the image on the original that is occupied by the color represented by the particular block. In other words, a color (block) to which a large number of pixels are allocated occupies a large area of the image and is highly likely to cause density and color failures.

In the method of the invention for determining the amount of exposure, the color (block) having a higher count than a specified value is identified as a multi-pixel color which is the cause of density and color failures and at least part of the pixels of that particular color is removed and the remaining pixels are used to determine the image characteristic quantities, on the basis of which mathematical operations are performed to determine the amount of exposure.

Thus, according to the invention, the cause of density and color failures is removed before the image characteristic quantities are computed and mathematical operations are performed to determine the amount of exposure; therefore, good prints having neither density nor color failure can be produced consistently without specifying the identity of an image scene to be reproduced.

Figure 4:
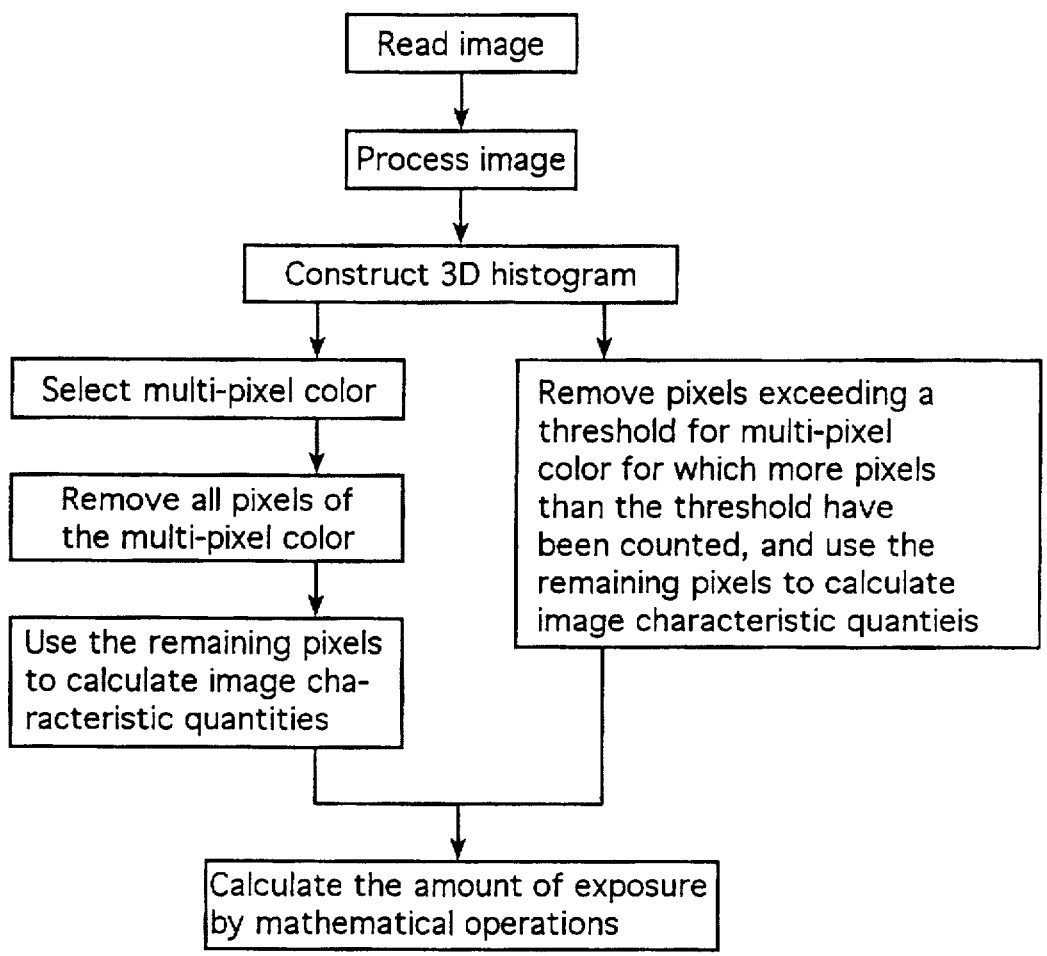
FIG. 4 is a flowchart of an exemplary method of determining the amount of exposure according to the invention.

In the method of the invention for determining the amount of exposure, at least part of the pixels representing the multi-pixel color is removed before the image characteristic quantities are computed and, as shown in the flowchart of FIG. 4, this can specifically be accomplished by either one of two techniques: all pixels of a color having a greater number of counts than a specified value are removed before the image quantities characteristic are calculated, or alternatively, a given count number is set as a threshold or a threshold corresponding to a given number of counts is established and only those pixels which have been found to be superfluous over that threshold are removed before the image characteristic quantities are calculated.

In the first approach which removes all pixels of a color having a greater number of counts than a specified value, prescan is performed to construct a density histogram and the color that has a greater number of counts than a specified value is selected as a multi-pixel color and after the histogram is completed, another prescan must be performed to remove the pixels of the multi-pixel color and the image data for the remaining pixels are integrated to calculate the image characteristic quantities.

The second approach which removes only those pixels which have been found to be superfluous over a threshold may be so adjusted that a density histogram is constructed as image data are integrated to calculate the image characteristic quantities and that when the counts of a specified color exceed the threshold, no further integration is performed. This adaptation permits a density histogram to be constructed almost simultaneously with the calculation of image characteristic quantities.

It should be noted that even in the first approach which removes all pixels of a color having a greater number of counts than a specified value, the second prescan cycle can be omitted if the densities of respective pixels are approximated by the colors of individual blocks in the histogram. In this embodiment, the multi-pixel color can be selected and removed as the histogram is constructed.

The "specified value" of counts, or the criterion by which a certain color is identified as the multi-pixel color which causes density and color failures, may be determined as appropriate for several parameters such as the width of density intervals on the three axes of the histogram and the exposure optics in the apparatus. Normally, it may be said that a large area of the image is occupied by a certain color if its pixels account for at least 3% of all the pixels involved (say, at least 180 pixels out of 6000).

With this factor taken into consideration, 1% of all the pixels involved is preferably set as the criterion in the embodiment where all pixels of a color having a greater number of counts than a specified value are to be removed.

The width of density intervals on the axes of the three-dimensional histogram is also not limited to the value 0.1 specified for the illustrated case. Generally speaking, the smaller the width of density intervals on the three axes of the histogram, the better because mathematical operations for computing the amount of exposure can be performed with closer adjustments being made to insure matching with the principal image portion and other factors. On the other hand, the required memory capacity will increase drastically as the width of density intervals is reduced. Hence, the density of intervals on the three axes of the histogram may be determined as appropriate for several parameters including the inherent memory capacity of the apparatus and the memory capacity required to effect other controls.

Preferably, the width of density intervals on the axes of the three-dimensional histogram is about 0.05–0.15.

In the method of the invention for determining the amount of exposure, the pixels that have been found to cause density and color failures are thusly removed and the remaining pixels are used to determine the image characteristic quantities, on the basis of which the amount of exposure for copying is determined, namely, the amounts by which the respective color filter plates in the filter section should be inserted into the optical path Lt, as well as the amount by which the variable diaphragm 184 should be inserted into the optical path Lt are determined, and relevant instructions are supplied to adjusting means 176 and 186.

In the invention, the method of calculating the image characteristic quantities and the method of computing the amount of exposure for copying by mathematical operations are in no way limited and all known methods for calculating the amount of exposure for copying (i.e., the method of determining the amount of color correction) can be employed, as exemplified by an LATD-based method, a method relying upon the designation of the principal subject in the original image, and the combination of the two methods. As to the amount of exposure for copying is mathematically operated by designating the principal subject and the exposure is performed based on the result thus obtained are disclosed, for example, in U.S. Pat. No. 4,531,150, JP-A-51-1128 (corr. U.S. Pat. No. 4,001,594) and JP-B-55-29412 (corr. U.S. Pat. No. 3,677,641).

If the apparatus that implements the method of the invention for determining the amount of exposure is of a type that performs mathematical operations to calculate the amount of exposure by designating (detecting) the principal portion and when the color (block) that has been marked for removal is close to the color of the image in the principal portion, there is no need to remove any pixels. This is also the case when the color marked for removal is either achromatic or near-achromatic. Judgment for achromaticity may be effected either using intermediate densities as calculated from the maximum and minimum R, G and B densities or on the basis of the balance between R, G and B densities.

The operation which the copier 10 performs to copy the image of a transmission-type original T by the above-described method of the invention for determining the proper amount of exposure will now be explained.

The operator first places the transmission-type original T on the scan table 188. After setting the copy ratio, the operator touches the START button. Then, the light source 162 turns on and the scan table 188 starts a prescan mode to scan the original T.

The light issuing from the light source 162 passes through the IR cut filter 168, the UV cut filter 170 and the B-G notch filter 172 successively to be admitted into the original T, and the transmitted light carrying the image information from the original T passes through the slit 164. In this operating mode, the respective color filters and the variable diaphragm 184 keep clear of the optical path Lt. Alternatively, they may be inserted into the optical path Lt in accordance with the standard conditions for copying the or iginal T.

The transmitted light passing through the slit 164 is deflected through an angle of 90° by the moving mirror 156 which is inserted into the optical path Lt as indicated by a dashed line in FIG. 3 and then focused on the line sensor 160 by means of the imaging lens 158; thus, the image of the original T is separated into the three primary colors R, G and B and read for each of these colors at a resolution of 256 pixels per line.

The output from the line sensor 160 is forwarded to the control unit 178, which performs the necessary processing on the output so that the original image that has been read (which is a positive image if the original T is a negative film) is displayed on the monitor 19.

On the basis of the result of prescanning, control unit 178 applies the method of the invention for determining the amount of exposure and, in the manner already described, constructs a three-dimensional density histogram, counts the number of pixels representing the same color in the histogram, removes at least part of the pixels representing the color for which the number of counts (pixels) has exceeded a specified value, determines image characteristic quantities from the remaining pixels, determines the amount of exposure for copying (i.e., the amounts by which the respective color filter plates in the filter section should be inserted into the optical path Lt and the amount by which the variable diaphragm 184 should be inserted into the optical path Lt) from the determined image characteristic quantities; and supplies relevant instructions to the adjusting means 176 and 186.

In accordance with the thus determined amount of exposure for copying, the adjusting means 176 and 178 functions to insert the respective color filter plates in the filter section and the variable diaphragm 184 into the optical path Lt, whereupon the moving mirror 156 is retracted from the optical path Lt by moving to the position indicated by a solid line in FIG. 3. Thereafter, the light source 162 turns on and the original T starts to be scanned for copying its image. As already mentioned, the speed of this main scanning step is dependent on the speed at which the thermally processable light-sensitive material A is scanned in the exposing section 38 and on the copy ratio.

The light issuing from the light source 162 passes through the IR cut filter 168, the UV cut filter 170 and the B-G notch filter 172 successively and has its color and quantity adjusted by the respective color filter plates and variable diaphragm 184 which have been inserted into the optical path Lt in accordance with the determined amount of exposure; the thusly adjusted light is admitted through the original T and the transmitted light carrying the image information from the original T passes through the slit 164.

The light passing through the slit 164 is magnified to the copy rate setting by means of the zoom lens 152 and thereafter reflected by the mirror 154. As already mentioned, for the copying of the original T, the mirror 148 pivots to the position indicated by a dashed line in FIG. 3, so the transmitted light is reflected by the mirror 150 to focus on the thermally processable light-sensitive material A which was withdrawn out of the magazine 20, cut to a predetermined length and transported through the exposing section 38 in synchronism with the above-described operation, thereby performing slit scan exposure on the material A.

The thusly exposed light-sensitive material A is brought into the switchback section 42, then reversed to enter the water applicator section 46, where it is coated with water which is an image forming solvent; thereafter, the image-receiving material B which was withdrawn out of the magazine 60, cut to a predetermined length and subsequently transported in synchronism with the above-described operation, is combined with the light-sensitive material A by means of the laminating roller 80 and the resulting combination is brought into the thermal development and transfer section 58.

The combination of the light-sensitive material a and the image-receiving material B is subjected to thermal development and transfer as it is transported through the gap between the endless belt 96 and the heating drum 82. Thereafter, the light-sensitive material A is first stripped from the heating drum 82 by means of the stripping finger 90 and then the image-receiving material B onto which the image has been transferred is stripped from the heating drum 82 by means of the stripping finger 92.

The stripped light-sensitive material A is guided by the transport guide plate 114 and other associated members to be brought into the scrap light-sensitive material stack box 115, whereas the image-receiving material B carrying the transferred image is guided by the transport guide plates 118 and other associated members to be ejected onto the tray 126 to produce a hard copy.

The foregoing description of the method of the present invention for determining the amount of exposure is mostly directed to the case of copying the image of a transmission-type original, particularly, a negative film. It should, however, be understood that this is not the sole case of the invention and it may be applied for copying the image from positive transmission-type originals such as reversal films and lantern slides, as well as for copying the image from reflection-type originals such as printed matter and photographs.

Needless to say, the method of the present invention for determining the amount of exposure is in no way limited to the case described above and various modifications and improvements can be made without departing from the spirit and scope of the invention.

As described in detail on the foregoing pages, the method of the present invention for determining the amount of exposure has the advantage that when applied to various types of optical image forming apparatus such as copiers, printers and photograph printing devices, it enables consistent production of good prints having no density or color failure without the need to specify the identity of an image scene of interest even if a large area of the image is occupied by a particular color as in a scene showing a person on the lawn or a scene taken with backlighting.

What is claimed is:

1. A method of determining an amount of exposure for use with an image forming apparatus that reads red, green and blue densities of an original image on a pixel basis and that determines the amount of exposure of a light-sensitive material in accordance with a result of the reading step, comprising the steps of:

adding those pixels of the same color which have been found to have red, green and blue densities within respective predetermined ranges as a result of the reading of said original image;

removing at least part of the pixels that represent a color having a greater number of pixels than a predetermined value; and performing mathematical operations for determining the amount of exposure with the remaining pixels.

2. A method according to claim 1, wherein said removing step comprises the steps of performing one of removing all pixels that represent said color having a greater number of pixels than said predetermined value are removed, and removing only those pixels which have been found to be superfluous over a predetermined threshold in summation for each color are removed.

3. A method according to claim 1, wherein removing of pixels representing said color having a greater number of pixels than said predetermined value is not performed when said color having the greater number of pixels is either achromatic or near-achromatic.

4. A method according to claim 1, wherein removing pixels representing said color having a greater number of pixels than said predetermined value is not performed when mathematical operations for determining the amount of exposure are conducted based on information obtained by one of designating and detecting principal portions in the original image and further that the color having the greater number of pixels is close to the color of images in the principal portion.

5. A method according to claim 2, wherein removing of pixels representing said color having a greater number of pixels than said predetermined value is not performed when said color having the greater number of pixels is either achromatic or near-achromatic.

6. A method according to claim 2, wherein removing pixels representing said color having a greater number of pixels than said predetermined value is not performed when mathematical operations for determining the amount of exposure are conducted based on information obtained by one of designating and detecting principal portions in the original image and further that the color having the greater number of pixels is close to the color of images in the principal portion.

* * * * *